Nov. 8, 1966 K. W. HOWARD 3,284,575

THRESHOLD RESPONSIVE ISOLATION FOR PARTY TELEPHONE LINES

Filed Dec. 9, 1963

INVENTOR

Kal W. Howard,

BY Watson, Cole, Grindle & Watson

ATTORNEYS 3,284,575

THRESHOLD RESPONSIVE ISOLATION FOR PARTY TELEPHONE LINES

Kal W. Howard, Charlottesville, Va., assignor to Stromberg-Carlson Corporation, a corporation of Delaware
Filed Dec. 9, 1963, Ser. No. 329,178
6 Claims. (Cl. 179—31)

This invention relates to party line telephone systems and more particularly it relates to means for disconnecting other parties on a line when one of the parties answers a call.

Although the desirability of privacy on a party line is obvious, it has been difficult to provide an acceptable system in the past. When special station apparatus is required involving extra switches or relays, or even extra lines, it becomes impractical to employ secrecy devices.

Thus, it is an object of this invention to provide simplified means for insuring party line secrecy which is operable in a conventional telephone system.

It is another object of the invention to provide an improved two wire multi-party telephone system which automatically prevents any party from overhearing or interrupting the call of another party.

A further object of the invention is to provide automatic means for locking out other parties on a party line after the first partly answers a call.

Thus, in accordance with the invention, a threshold device is employed at each station set along a party line, which responds to the answering of a call to pass current solely to the answering station. The threshold device, which may be a four-layer diode, becomes conductive above a voltage level V and continues to conduct until the current falls below a sustaining current level I. The circuit at the station set thus couples the threshold device in series circuit between the line and the set to receive a voltage of at least V when the hook switch is operated in answering a call.

The circuit has low enough resistance to maintain a current of at least I while the call is in progress, where the line voltage is thereby reduced to a level below V. Thus, other devices do not break down but isolate the other party line sets once a call is answered. When the call is completed the hook switch reduces the current below I by opening the circuit to permit other parties access to the line.

Figure 1:
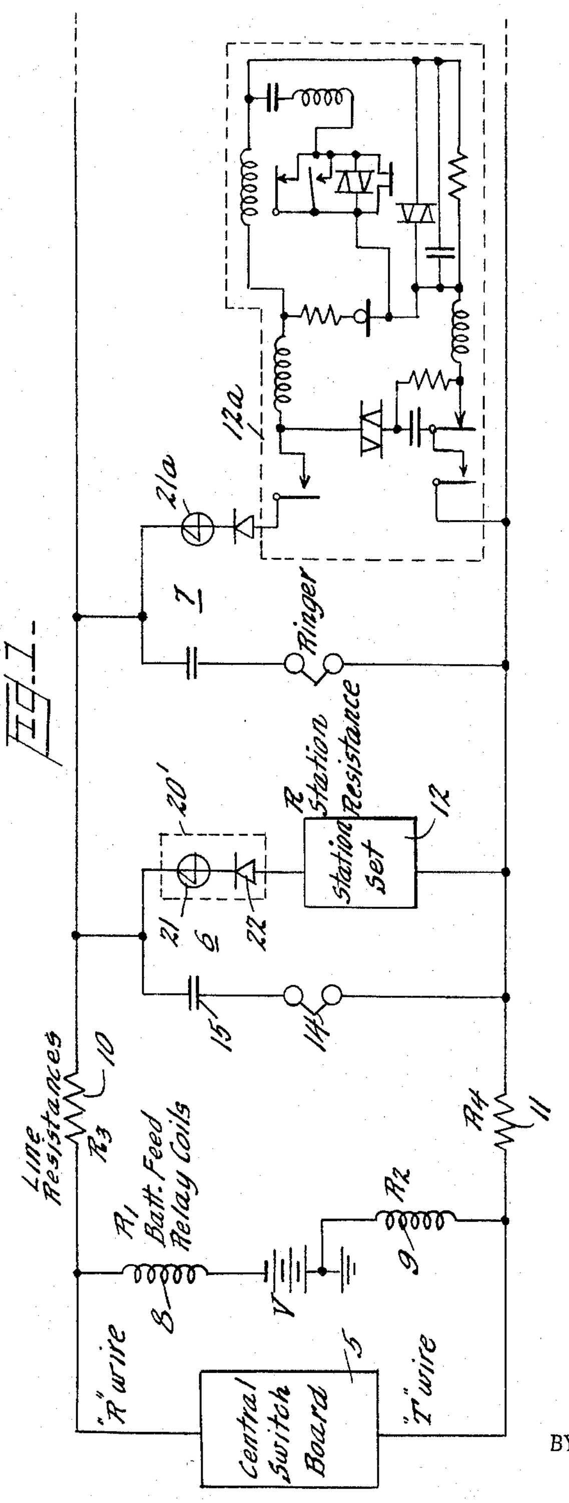
Figure 2:
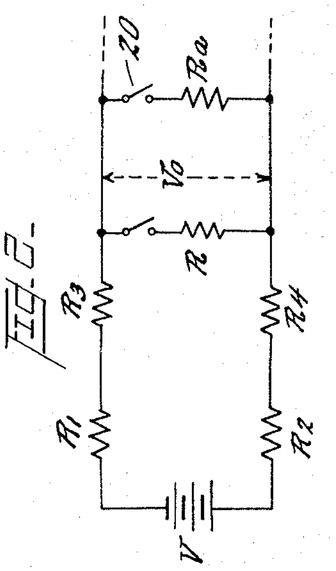

Operational details together with further description of the invention and its nature is found hereinafter with reference to the accompanying drawing, wherein:

FIGURE 1 is a schematic diagram of a typical party line embodying the invention, and FIGURE 2 is an equivalent circuit diagram illustrating operation of the invention.

As shown in FIGURE 1, the central switchboard 5 through the tip wire "T" and ring wire "R" supply a series of local party line station sets 6, 7, etc. A battery voltage V is fed to the line through battery feed relay coils 8, and 9 having respective resistances R1 and R2. The wire resistance of the line from the station to the local party line is lumped into resistors 10 and 11 having respective resistances R3 and R4. Each local station set circuit 12 has a resistance R shunting the line when the hook switch is closed and a call is in progress. The ringer 14 and ringing capacitor 15 at each local station is also connected in shunt with the line.

It has been discovered in accordance with the present invention that the local voltage $Vo$ across the line, as may be seen from the equivalent diagram of FIGURE 2, varies substantially between open circuit and in use conditions. Consider the local switch 20 closed so that current flows from the source V. The drop across resistances R1, R2, R3 and R4 is considerable as compared with the drop across $Ra$. Thus, the local line voltage $Vo$ is substantially V when all sets are disconnected and is a small portion of V when any set is in use. The short line sections between parties provide negligible resistance. This operational characteristic of change in voltage at the station set is used in accordance with the invention to provide secrecy on the party line by locking out all other parties when the first party answers a call.

Consider the switches 20 of FIGURE 2 to be equivalent to the threshold devices 20' of FIGURE 1, where the hook switch is not shown in the equivalent circuit. Thus, it may be seen that the threshold device 20' should have the property of non-conduction at low voltage $Vo$, and low resistances when conducting so that audio signals are not attenuated. Furthermore, the device should be triggered by the voltage V into conduction when the hook switch is closed and should remain conducting while the call is in progress and be made non-conductive again when the hook switch is opened. The well known Shockley or four-layer diode 21 has such properties and may be selected to operate on the normal voltages V and $Vo$ encountered in standard telephone systems. Rectifier 22 is included to prevent alternating ringing voltage or other polarity reversals from introducing reverse current in the four-layer diode.

Operation of the threshold device in providing secrecy between party line station sets 12, 12*a*, etc. may now be considered. It may be seen that the first party to answer a ring will connect the threshold device 20' to the line voltage V by operating the hook switch. This occurs without change to the telephone line, system or station set construction by simply connecting the threshold device 20' in series with the station set 12 across the telephone line wires "R" and "T."

Thus, as the hook switch is operated the threshold device at the corresponding station set becomes conductive, and its effect is the same as that of closing switch 20 of FIGURE 2. The current flow I through $R_1$, $R_2$, $R_3$, $R_4$ and $Ra$ is well above the sustaining current causing the four-layer diode 21 to remain conductive at very low impedance. Also, the voltage $Vo=IRa$ is much below the breakdown threshold of any other four-layer diode 21 at the other station sets, so that they will remain non-conductive as long as the set is in use during the call with the hook switch connecting the set to the line to maintain current I. In their non-conductive state the further four-layer diodes 21*a*, etc. will prevent any other party from making connection to the line by operation of their hook switches. Thus, the other parties are locked out and may neither overhear nor interrupt the call of the first answering party. Of course, the same result is obtained should a party wish to place a call rather than to answer a ring.

As seen from the equivalent circuit, all switches 20 but one will be open after the first one is closed. Thus, the use of a simple threshold device connecting each station set to the line will permit a standard party line to be converted to a locked out party line without alteration of system requirements, hook switch connections, addition of relays or switch contacts, or the stringing of additional wires.

Having therefore provided an improved telephone system, those features of novelty identifying my invention are defined with particularity in the following claims:

What is claimed is:

1. A party telephone line comprising in combination, a pair of telephone wires, a direct current voltage source, a plurality of station sets each having a hook switch for connecting the set between said wires, and a voltage threshold device connected between each of the sets and the same one of the wires which breaks down to pass current when encountering substantially the entire voltage from the source but remains non-conductive when encountering only the potential drop across the line due to current flow through the station set from said source.

2. A party line as defined in claim 1, wherein the threshold device comprises a four-layer diode and a rectifier poled to pass the direct current voltage in series circuit.

3. A party line as defined in claim 1, wherein a ringing circuit is connected directly between said lines at each station.

4. In a party line telephone system, a plurality of party station sets coupled to a common telephone circuit producing a direct voltage battery voltage V, a normally non-conductive threshold device coupling each of said sets to the telephone circuit operable to break down and conduct with a small voltage drop across the circuit upon receiving substantially the entire voltage V until current is interrupted by opening the conduction circuit, and local switching means at each set serving to apply the voltage V to said threshold device upon answering a call and to interrupt the conduction current upon termination of the call, thereby causing the first set answered to prevent other threshold devices from receiving the voltage V and ensuring lockout of the other parties on the line.

5. A combination as defined in claim 4, wherein the threshold device comprises a four-layer diode.

6. In a party line telephone system having a plurality of station sets each coupled to a line with an open circuit battery voltage level of at least V, the improvement comprising, a threshold device in series with each set having the properties of becoming conductive at a threshold below the threshold level voltage V and continuing to conduct at a reduced voltage while a sustaining current I is passed and a low resistance circuit at the station set coupling the battery voltage to the threshold device when a call is answered passing current of at least I while the call is in progress to maintain a line voltage at a threshold device of less than V and reducing the current below I when the call is completed.

References Cited by the Examiner

UNITED STATES PATENTS

| | | | |
|---|---|---|---|
| 1,899,014 | 2/1933 | Christian et al. | 179—30 |
| 2,841,647 | 7/1958 | Blow | 179—14 |

KATHLEEN H. CLAFFY, *Primary Examiner.*

J. W. JOHNSON, *Assistant Examiner.*